United States Patent [19]

May

[11] Patent Number: 5,072,910

[45] Date of Patent: Dec. 17, 1991

[54] ADJUSTABLE TRIPOD STAND

[76] Inventor: Randall L. May, 7712 Unit B Talbert Ave., Huntington Beach, Calif. 92648

[21] Appl. No.: 535,580

[22] Filed: Jun. 11, 1990

[51] Int. Cl.⁵ .......................................... F16M 11/00
[52] U.S. Cl. .................................... 248/412; 248/170; 248/188.2
[58] Field of Search .................. 248/171, 188.2, 188.7, 248/188, 218.4, 219.3, 411, 170, 410, 414, 245, 297.5, 188.5, 408, 125, 157, 412, 916; 182/200

[56] References Cited

U.S. PATENT DOCUMENTS

| | | | |
|---|---|---|---|
| 740,886 | 2/1902 | Marten | 248/171 X |
| 773,787 | 11/1904 | Crossman et al. | 248/171 X |
| 1,517,825 | 12/1924 | Bruneau | 248/171 |
| 1,894,695 | 1/1933 | Ley | 248/171 |
| 2,864,577 | 12/1958 | DuMais | 248/171 |
| 3,312,432 | 4/1967 | Pfeiffer et al. | 248/188.7 X |
| 3,780,974 | 12/1973 | Takahashi | 248/411 |

Primary Examiner—David L. Talbott
Assistant Examiner—Derek J. Berger
Attorney, Agent, or Firm—Neal J. Mosely

[57] ABSTRACT

An adjustable tripod stand having independently adjustable legs comprises a longitudinal extensible upright portion of telescoping tubular members, a plurality of collar members slidably mounted on the upright portion which are longitudinally adjustable relative to one another and to the upright portion for selective positioning thereon, and a plurality of movable leg members operatively connected to upper and lower collar members for selective independent longitudinal positioning and radial extension relative to the upright portion and to one another. When an upper leg supporting collar and the corresponding lower collar are moved toward each other on the upright portion, the bottom of the leg connected thereto will be extended radially outward independently of the other legs, and when the upper leg supporting collar and the corresponding lower collar are moved away from each other, the bottom of the leg connected thereto will be drawn radially inward independently of the other legs. The independent positioning of the legs may be at different distances from the upright portion or in different planes relative to the other legs and thus allows the stand to be erected in limited or confined areas or on multi-level surfaces. The independent positioning of the legs also allows the longitudinal axis of the stand to be tilted to an off-vertical axis position for positioning the center of gravity of the supported vehicle within the supporting legs.

26 Claims, 4 Drawing Sheets

ADJUSTABLE TRIPOD STAND

BACKGROUND OF THE INVENTION

1. Field of the Invention

This invention relates generally to tripod stands, and more particularly to an adjustable tripod stand for supporting various articles which has independently adjustable movable legs.

2. Brief Description of the Prior Art

Because of their size, weight, portability and ease and speed of deployment, tripod stands are desirable for supporting various articles and instruments since they provide selective height adjustment and a stable support. They are particularly useful is supporting such things as cameras, video equipment, telescopes, surveying instruments, and musical instruments.

Some tripod stands have legs which may be adjusted in length to maintain the supported article in a level position on uneven ground but the legs are not independently adjustable relative to one another and to the vertical support member, thus the center of gravity may be off-axis. In other words, the vertical portion of the stand cannot be oriented in an off-axis position and still maintain the center of gravity for a stable support system.

Another problem with conventional tripod stands is that the legs are not particularly suited for reducing the perimeter of the support base and still provide a stable support system when placing the legs in close or confined areas and on multi-level surfaces.

There are several patents which describe various adjustable tripod stand devices.

Viken, U.S. Pat. No. 1,795,747 discloses a tripod having collapsible legs with an extensible support composed of three telescoping members slidably supported by the legs.

Bogar, U.S. Pat. No. 3,307,814 discloses a stand for instruments of the type having a box-like casing. The stand has telescopically adjustable legs or vertical tubular upright members and a tray at the top of the uprights.

Boehm, U.S. Pat. No. 3,570,130 discloses a holding device for surveying instruments which includes a channel-like mounting bracket with a pair of instrument gripping clamps and a pair of adjustable legs thereon which cooperate with the instrument to form a tripod type support for supporting the instrument in a reference position.

The present invention is distinguished over the prior art in general, and these patents in particular by an adjustable tripod stand with independently adjustable legs which comprises a longitudinal extensible upright portion of telescoping tubular members, a plurality of collar members slidably mounted on the upright portion which are longitudinally adjustable relative to one another and to the upright portion for selective positioning thereon, and a plurality of movable leg members are operatively connected to upper and lower collar members for selective independent longitudinal positioning and radial extension relative to the upright portion and to one another.

When the upper leg supporting collar and the corresponding lower collar are moved toward each other on the upright portion, the bottom of the leg connected thereto will be extended radially outward to be positioned an unequal distance from the center of the upright portion relative to the other legs, and the upper leg supporting collar and the corresponding lower collar are moved away from each other, the bottom of the leg connected thereto will be drawn radially inward to be positioned an unequal distance from the center of the upright portion relative to the other legs. The independent positioning of the legs allows the stand to be erected in limited or confined areas or on multi-level surfaces. The independent positioning of the legs also allows the longitudinal axis of the stand to be disposed in an off-vertical axis position for positioning the center of gravity of the supported article relative to the center of the supporting legs.

SUMMARY OF THE INVENTION

It is therefore an object of the present invention to provide an adjustable tripod stand for supporting articles which has independently adjustable movable legs.

It is another object of this invention to provide an adjustable tripod stand for supporting articles which allows for multiple angularities and tripod configurations.

Another object of this invention is to provide an adjustable tripod stand for supporting articles which has independently adjustable movable legs which has increased versatility and stability in the support system.

Another object of this invention is to provide an adjustable tripod stand for supporting articles which allows for multiple angularities and tripod configurations whereby the body of the stand may be oriented in an off-axis position and still maintain the center of gravity in a stable support system.

Another object of this invention is to provide an adjustable tripod stand for supporting articles having a variety of multiple angularities and tripod configurations to allow the stand to be erected on uneven surfaces or multi-level surfaces and still maintain the center of gravity in a stable support system.

Another object of this invention to provide an adjustable tripod stand for supporting articles which allows for multiple angularities and tripod configurations of the legs to reduce the support base perimeter and maximize placement of the stand in limited or confined areas.

A further object of this invention is to provide an attractive adjustable tripod stand for supporting articles which is of lighter weight than conventional steel stands.

A still further object of this invention is to provide an adjustable tripod stand for supporting articles which is simple in construction, economical to manufacture, and rugged and reliable in use.

Other objects of the invention will become apparent from time to time throughout the specification and claims as hereinafter related.

The above noted objects and other objects of the invention are accomplished by an adjustable tripod stand with independently adjustable legs which comprises a longitudinal extensible upright portion of telescoping tubular members, a plurality of collar members slidably mounted on the upright portion which are longitudinally adjustable relative to one another and to the upright portion for selective positioning thereon, and a plurality of movable leg members are operatively connected to upper and lower collar members for selective independent longitudinal positioning and radial extension relative to the upright portion and to one another.

When the upper leg supporting collar and the corresponding lower collar are moved toward each other on the upright portion, the bottom of the leg connected thereto will be extended radially outward to be positioned an unequal distance from the center of the upright portion relative to the other legs, and the upper leg supporting collar and the corresponding lower collar are moved away from each other, the bottom of the leg connected thereto will be drawn radially inward to be positioned an unequal distance from the center of the upright portion relative to the other legs. The independent positioning of the legs allows the stand to be erected in limited or confined areas or on multi-level surfaces. The independent positioning of the legs also allows the longitudinal axis of the stand to be disposed in an off-vertical axis position for positioning the center of gravity of the supported article relative to the center of the supporting legs.

DESCRIPTION OF A PREFERRED EMBODIMENT

Figure 6:
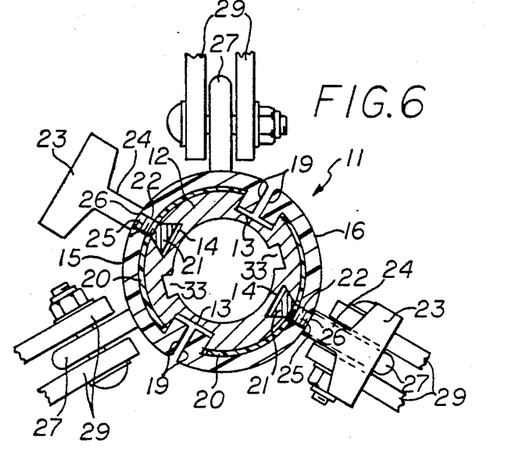
FIG. 6 is a transverse cross section through the leg support upper collar member of the stand of FIG. 1.
Figure 7:
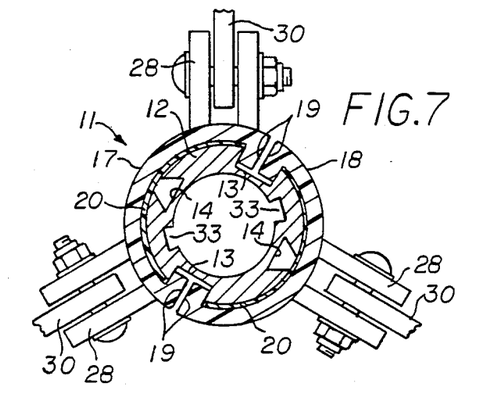
FIG. 7 is a transverse cross section through the leg brace support lower collar member of the stand of FIG. 1.
Figure 8:
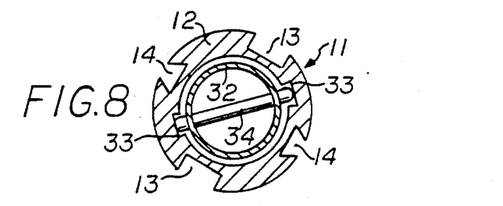
FIG. 8 is a transverse cross section through the inner and outer tubular members of the stand of FIG. 1.

Referring to the drawings by numerals of reference, there is shown in FIGS. 1-5, a preferred adjustable tripod stand 10 having a longitudinal upright portion 11 formed of telescoping tubular members. The lower section of the upright portion 11 comprises an elongate outer tubular member 12 having a plurality of circumferentially spaced grooves extending longitudinally on its exterior surface. Referring additionally to FIGS. 6-8, in the illustrated embodiment, four grooves are shown, two diametrically opposed grooves 13 being generally U-shaped in cross section, and the other two diametrically opposed grooves 14 being dovetail shaped in cross section.

As seen in FIGS. 6 and 7, a pair of semi-circular upper leg support collar members 15 and 16 and a pair of semi-circular leg brace support collar members 17 and 18 are slidably mounted on the outer tubular member 12. Each of the collar members 15, 16, 17, and 18 are semi-circular in cross section with the longitudinal edges 19 bent inwardly to be received within the longitudinal grooves 13. A semi-circular sleeve element 20 is installed between the exterior of the outer tubular member 12 and the interior of each collar segment. The sleeve element 20 is of a low friction material, such as nylon, to facilitate sliding movement of the collar segments on the outer tubular member.

A pair of wedge elements 21 are slidably received within the dovetail grooves 14 inwardly adjacent to each of the collar segments. Each wedge 21 is slightly smaller in cross section than the dovetail groove 14. A hole 22 extends radially through the side wall of each collar segment and each sleeve and each wedge 21 has a threaded stud 25. Wing nuts 23 are provided which have a shank portion 24 internally threaded to fit stud 25.

When the wing screw 23 is loosened, the wedge 21, collar 15, 16, and sleeves 20, are free to slidably move as a unit longitudinally on the outer tubular member 12 but are captured on the outer member by the wedge 21 retained in the dovetail groove 14 and the edges 19 of the collars 15 and 16 retained within the grooves 13. Thus, each collar 15 and 16 are independently movable relative to one another and the outer tubular member. When the wing screw 23 is tightened, its shoulder 26 engages the exterior of the collar and the wedge 21 is drawn into firm engagement on the angular sides of the dovetail groove 14, thus locking the collars 15 and 16 in a desired position on the outer tubular member 12.

The leg brace support collar members 17 and 18 are substantially similar in construction and operation to the upper leg support collar members 15 and 16 (FIG. 7). Each collar segment 17 and 18 is semi-circular in cross section with the longitudinal edges 19 bent inwardly to be received within the longitudinal grooves 13, each has a semi-circular sleeve element 20 installed between the exterior of the outer tubular member 12 and the interior of each collar segment bore, and are connected by wing screws 23 to slidably move independently on the outer tubular member 12 as described above. Thus, each collar 15, 16, 17, and 18 is independently movable relative to one another and the outer tubular member, and each may be locked in a desired position on the outer tubular member 12.

As best seen in FIGS. 6 and 7, the upper leg support collar members 15 and 16 have integral tongues 27 projecting radially from their exterior and the leg brace support collar members 17 and 18 have integral yokes 28 projecting radially from their exterior. In the illustrated embodiments, there are two circumferentially spaced tongues 27 on the collar segment 15, and one tongue on the collar segment 16, and two yokes 28 on the collar segment 17 and one yoke on the collar segment 18. The yokes and tongues are equally spaced apart circumferentially for mounting three legs thereon. Although three tongues and three yokes are illustrated, it should be understood, that more than three may be provided for mounting more than three legs.

The upper end of a leg member 29 is pivotally mounted on each tongue 27 and a leg brace member 30 is pivotally mounted at one end in each yoke 28. The free end of the leg brace 30 is pivotally connected to the leg member 29 intermediate its ends. A foot pad 31 formed of resilient material is provided on the bottom end of each leg member. It should be understood that the bottom end of each leg member 29 may also be provided with a wheel or caster 31A as seen in FIG. 4.

Figures 1, 2, 3, 4:
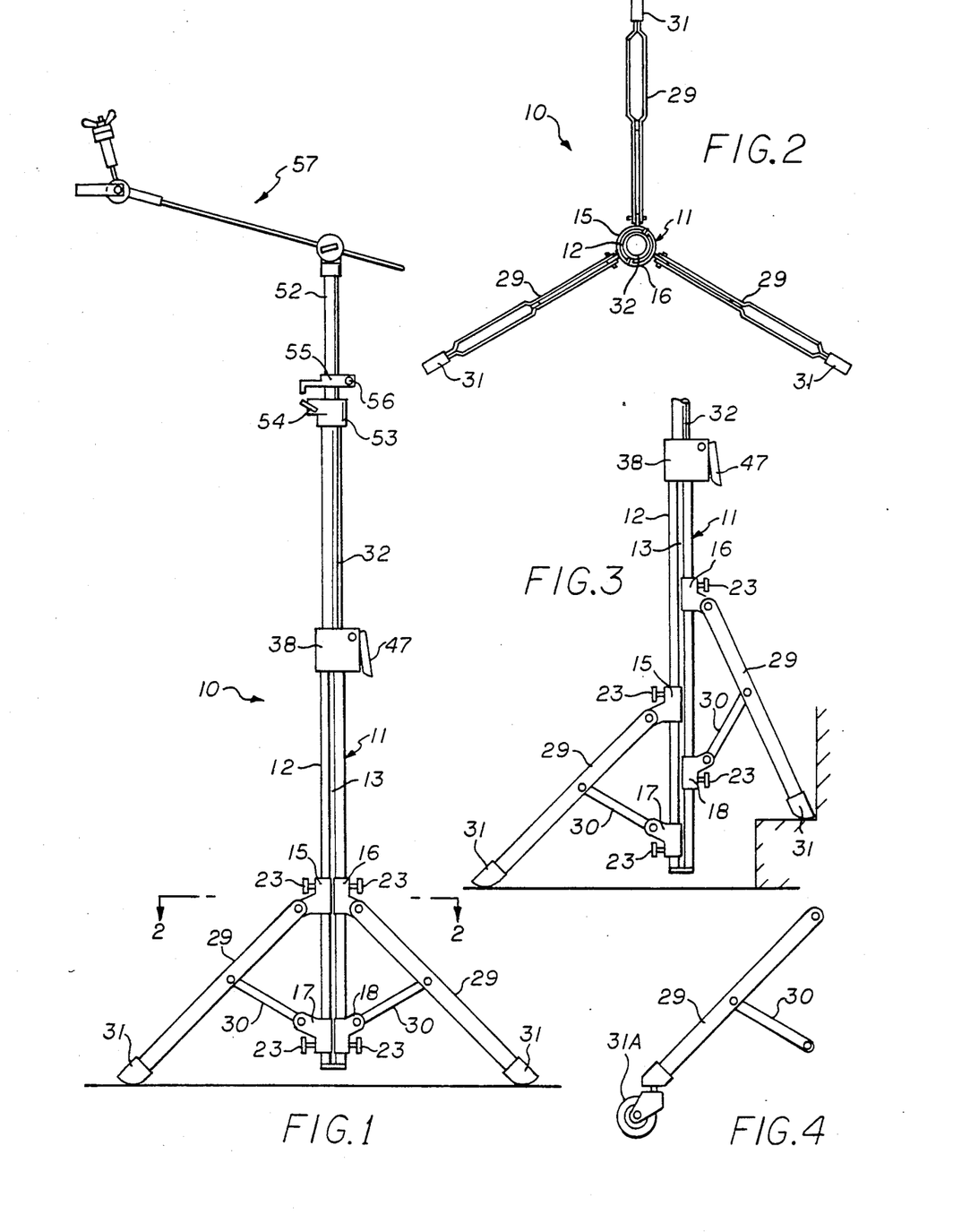
FIG. 1 is an elevation view of a preferred adjustable tripod stand in accordance with one embodiment of the present invention.
FIG. 2 is a transverse cross section through the lower portion of the adjustable tripod stand taken along line 2—2 of FIG. 1.
FIG. 3 is a partial elevation view of the stand of FIG. 1 shown with the legs adjusted for placement on a multi-level surface.
FIG. 4 is a partial elevation view of an embodiment of a leg member having casters at the bottom end.
Figure 5:
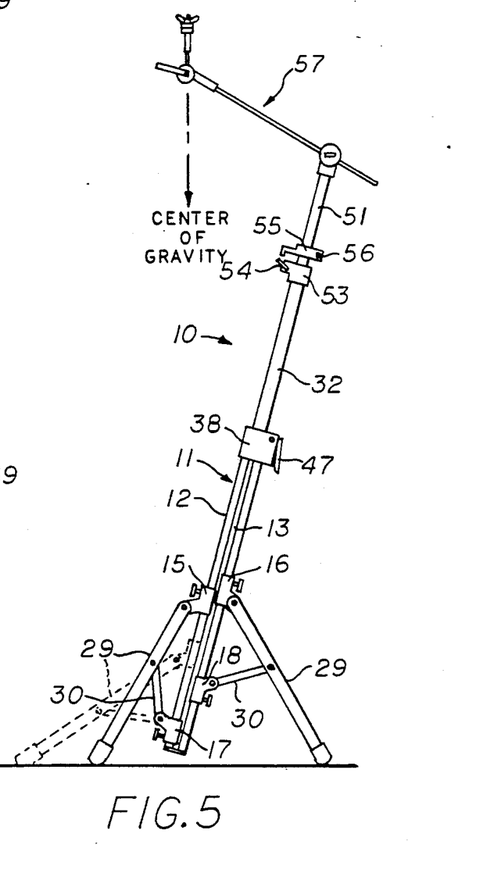
FIG. 5 is an elevational view of the stand having its legs adjusted to position the center of gravity of the supported article within the support base.

As seen in FIGS. 1, 3, and 5, when the upper leg collar segments 15 and 16 and leg brace collar segments 17 and 18 are positioned across from one another respectively, the bottom of the legs will extend radially an equal distance from the center of the tubular member 12. If one of the upper leg collar segments 15 or 16 and its corresponding leg brace collar segment 17 or 18 are moved toward each other on the tubular member 12, the bottom of the leg(s) connected thereto will be extended radially outward to be positioned an unequal distance from the center of the tubular member 12 relative to the other leg(s). If one of the upper leg collar segments 15 or 16 and its corresponding leg brace collar segment 17 or 18 are moved away from each other on the tubular member 12, the bottom of the leg(s) connected thereto will be drawn radially inward to be positioned an unequal distance from the center of the tubular member 12 relative to the other leg(s) (FIG. 5). This allows for placement of the stand in limited or confined areas. If the legs are supported on a level surface, this adjustment will cause the longitudinal, vertical axis of the stand to be disposed in an off-vertical axis position for placing the center of gravity of the supported article relative to the center of the supporting legs (FIG. 5). This adjustment also provides a minimum or maximum peripheral support base.

As seen in FIG. 3, in addition to the adjustment described above, the upper leg support collars 15 and 16 and the leg brace collars 17 and 18 may be positioned in vertically spaced pairs relative to the other vertically spaced pair. For example, one of the upper leg brace collar segments 15 or 16 and its corresponding leg brace collar segment 17 or 18 may both be moved upward on the tubular member 12 relative to the other pair and the bottom of the leg(s) connected to the upper pair will be raised relative to the other leg(s). As described above, the legs may also be extended radially inward and outward. This allows for placement of the stand on an uneven or multi-level surface or platform and also in limited or confined areas. The legs may be adjusted relative to an uneven or multi-level surface to cause the vertical axis of the stand to be disposed in an off-vertical axis position for placing the center of gravity of the supported article relative to the center of the supporting legs even if they are at different heights.

An elongate inner tubular member 32 is slidably received within the outer tubular member 12. As seen in FIG. 8, the outer tubular member 12 may have a pair of diametrically opposed U-shaped grooves 33 extending longitudinally on its interior surface and the lower end of the inner tubular member 32 may be provided with a rod or pin 34 extending transversely through its side wall. The outer ends of the rod or pin 34 are received within the opposed grooves 33 to prevent relative rotary movement between the inner and outer tubular members but allowing relative longitudinal movement.

Figure 9:
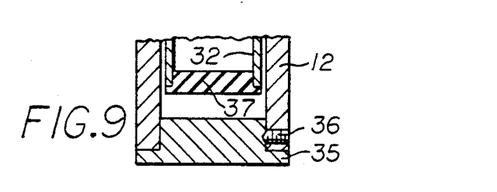
FIG. 9 is a longitudinal cross section through the bottom portion of the inner and outer tubular members of the stand of FIG. 1.

As shown in FIG. 9, the bottom end of the outer tubular member 12 may be enclosed by an end cap 35 secured therein by a set screw 36 or other conventional means. This causes air to be trapped within the tubular members and to escape slowly through the clearance annulus between the tubular members if the inner tubular member is suddenly released. In other words, the air within the upright portion of the stand acts as a shock absorber and allows the inner tubular member to descend slowly in the event that it is suddenly or accidentally released. In normal assembly conditions, the top end of the inner tubular member, or a subsequent upper tubular member is provided with an end fitting which substantially closes off the top end of the upright members. However, to facilitate the shock absorber effect, the open bottom end of the inner tubular member 32 may have a plug 37 whereby it would act as a loosely fitting piston within the outer tubular member 12.

Referring now to FIGS. 1 and 10-12, a clamp member 38 is mounted on the top end of the outer tubular member 12. Clamp member 38 has a generally cylindrical body 39 with a bore 40 extending from the bottom end and terminating in a reduced diameter intermediate bore 41 forming a circumferential shoulder 42 therebetween and the intermediate bore 41 terminates in a smaller bore 43 at the top end of the clamp body. The bore 40 is slightly larger than the outside diameter of the outer tubular member 12 to be slidably received thereon, and the smaller bore 43 is slightly larger than the outside diameter of the inner tubular member 32 allowing it to pass slidably therethrough. The shoulder 42 engages the top end of the outer tubular member 12 and the intermediate bore 41 is larger than the outside diameter of the inner tubular member 32 defining an annulus therebetween. The clamp member 38 is secured to the top of the outer tubular member 12 by a set screw 44 or other conventional means.

Figure 10:
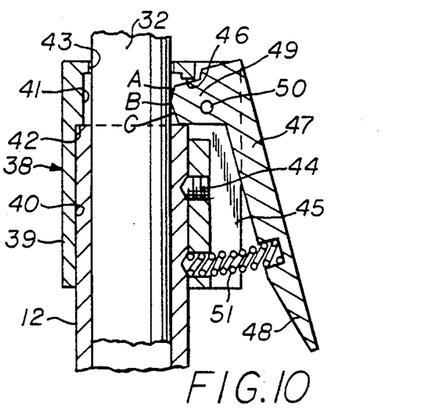
FIGS. 10-12 are longitudinal cross sections illustrating the latch clutch mechanism of the stand of FIG. 1.
Figure 11:
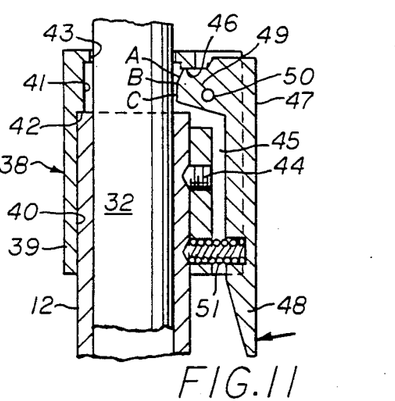
Figure 12:
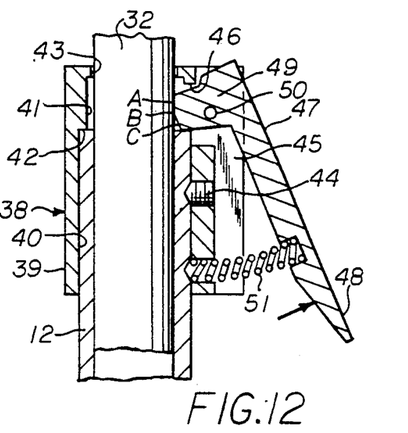

A longitudinal slot 45 extends along one side of the clamp body 39 and an opening 46 extends laterally between the intermediate bore 41 and the slot 45. A lever member 47 having a hand grip portion 48 with an inwardly facing camming surface 49 at the upper end thereof is pivotally supported on a pin 50 within the slot 45. A compression spring 51 has one end engaged in the clamp body 39 and its other end engaged on the hand grip portion 48 of the lever 47. The inner face of the camming surface 49 is divided into three angular planes A, B, and C.

FIG. 10 shows the clamp member 38 with its lever 47 in an intermediate position wherein the middle angular plane B of the camming surface 49 is engaged on the exterior of the inner tubular member 32. The spring 51 provides sufficient force to frictionally engage the middle angular plane B with the inner tubular member 32 whereby the inner tubular member is maintained at the selected height under normal support conditions but may be rotated without gripping the lever, upon application of sufficient force to overcome the frictional engagement. In this case, the clamp member 38 acts as a friction clutch.

FIG. 11 shows the clamp member 38 with lever 47 in an unlocked position wherein the hand grip portion 48 is squeezed inward to align the lower angular plane C of the camming surface 49 substantially parallel to the exterior of the inner tubular member 32. In this position, the inner tubular member 32 slides freely through the clamp member as long as the lever 47 is pressed inward. When the lever 47 is released, the spring 51 returns the lever to the intermediate position to frictionally engage the middle angular plane B with the inner tubular member as described above.

FIG. 12 shows the clamp member 38 with its lever 47 in an upper or locked position wherein the hand grip portion 48 is pivotally raised past the intermediate position to forcefully engage the upper plane A of camming surface 49 with the exterior of inner tubular member 32. In other words, the upper angular plane A of camming surface 49 is wedged against the exterior of the inner tubular member 32. In this position, the inner tubular member 32 is securely locked at the selected height under heavy support conditions to prevent accidental or unexpected longitudinal movement.

Referring again to FIG. 1, a third tubular member 52 may be slidably received inside the inner tubular member 32 and a conventional split clamp member 53 having the usual bolt and wing nut 54 to may be secured at the upper end of the inner tubular member 32 to clamp the third tubular member 52 at a desired height. A conventional inverted L-shaped clamp member 55 having the usual bolt and wing nut 56 may also be installed on the exterior of the third tubular member 52 and engaged on the clamp 53 to maintain the upper portion of the upper upstanding members at the desired circumferential orientation relative to the base portion.

Similarly, the top portion of the stand may be provided with various conventional tripod mounting hardware for mounting a variety of articles and instruments such things as cameras, video equipment, telescopes, surveying instruments, and musical instruments. It should be understood that the particular tripod stand illustrated has a top portion configured to support musical cymbals, however other top portions may be provided for supporting such things as cameras, video equipment, telescopes, surveying instruments, and the like.

ANOTHER EMBODIMENT

Figures 13, 14, 15:
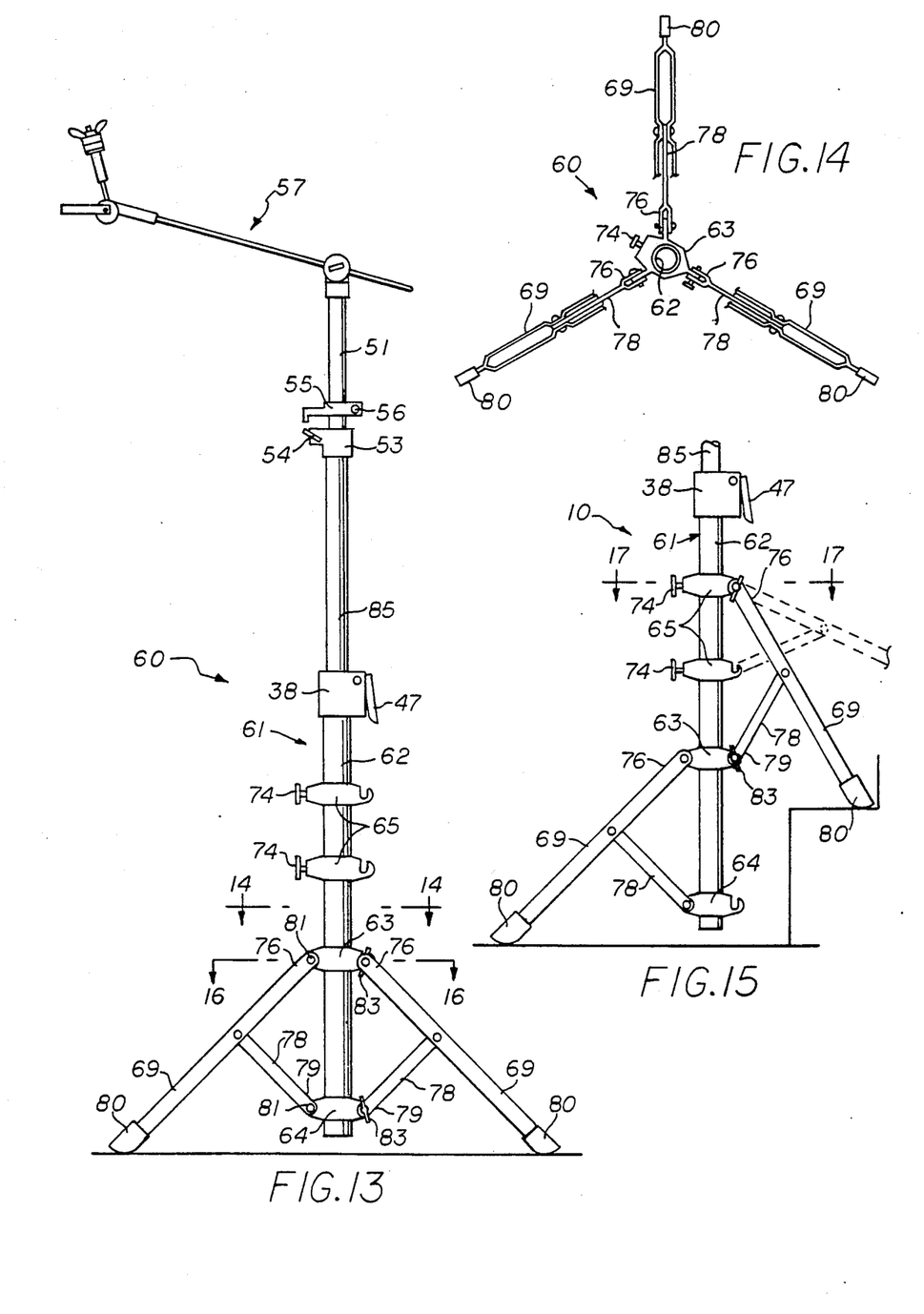
FIG. 13 is an elevation view of another embodiment of a preferred adjustable tripod stand in accordance with the present invention.
FIG. 14 is a transverse cross section through the lower portion of the adjustable tripod stand taken along line 14—14 of FIG. 13.
FIG. 15 is a partial elevation view of the stand of FIG. 13 shown with the legs adjusted for placement on a multi-level surface.

Referring now to FIGS. 13-18 of the drawings, there is shown in FIG. 13, another adjustable tripod stand 60 having independently movable legs. The lower section of the upright portion 61 comprises an elongate outer tubular member 62 having a plurality of leg supporting collars mounted thereon.

At least one vertically spaced pair of collar members serve as an upper leg support collar 63 and leg brace support collar 64 respectively. One or more auxiliary support collars 65 may also be mounted on the outer tubular member 62.

Figure 16:
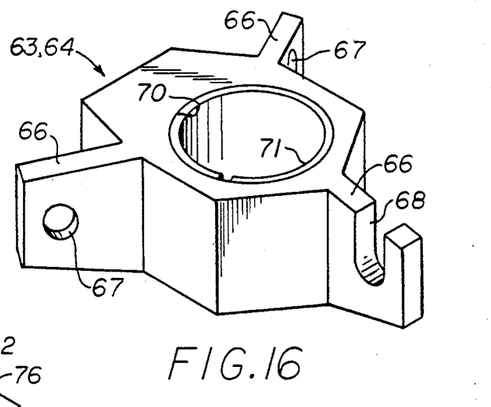
FIG. 16 is an isometric view of a leg support collar of the stand of FIG. 13.
Figure 17:
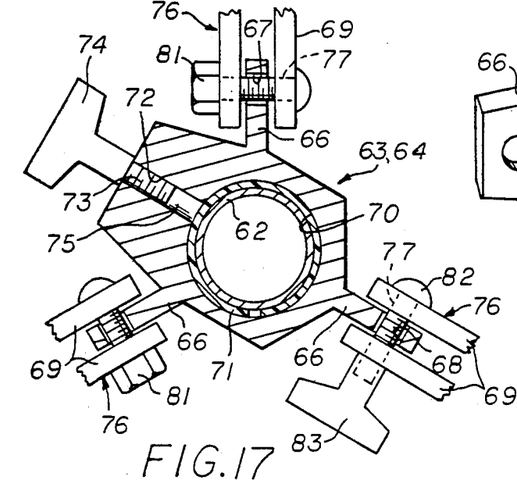
FIG. 17 is a transverse cross section through the leg support collar member of the stand of FIG. 13.
Figure 18:
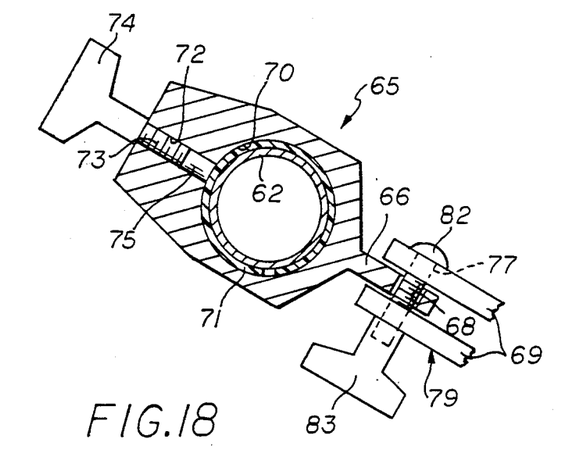
FIG. 18 is a transverse cross section through an auxiliary leg support collar member of the stand of FIG. 13.

As best seen in FIGS. 16, 17, and 18, the collar members 63 and 64 have integral tongues 66 projecting radially from their exterior and the auxiliary support collars 65 have only one radial tongue 66. In the illustrated embodiment of FIG. 17, two of the tongues 66 have a transverse hole 67 extending therethrough and a third tongue has a vertical slot 68 extending a distance downward from the top end of the tongue. The tongues 66 are equally spaced circumferentially for mounting three legs 69 thereon. Although three tongues are illustrated, it should be understood, that more than three may be provided for mounting more than three legs.

As seen in FIG. 18, each auxiliary collar 65 has a single tongue 66 projecting radially from its exterior and has a vertical slot 68 extending a distance downward from the top end of the tongue. It should be understood that the auxiliary collars 65 could also have more than one tongue equally spaced apart circumferentially for mounting more than one leg thereon.

The leg supporting collars 63, 64 and auxiliary collars 65 each has a generally rectangular main body with a bore 70 extending therethrough vertical to the longitudinal axis of the body. A split sleeve element 71 is installed in the bore 70 to reside between the exterior of outer tubular member 62 and the interior of each collar bore. Sleeve element 71 is of a low friction material, such as nylon, to facilitate sliding movement of the collars on the outer tubular member. A threaded hole 72 extends radially through the side wall of each collar and receives the threaded end 73 of a wing screw 74. A plug or pin 75 may also be slidably positioned in the hole 72 between the end of the wing screw 74 and the exterior of the split sleeve 71 to bear on the sleeve.

When the wing screw 74 is tightened, its threaded end surface forces the pin 75 into firm engagement on the exterior of the split sleeve 71 and forces the sleeve into firm engagement on the exterior of the outer tubular member 62, thus locking the collars in a desired position on the outer tubular member. When the wing screw 74 is loosened, the griping force of the sleeve 71 is relaxed, and the collar is free to slidably move longitudinally on the outer tubular member 62. Thus, each collar 63, 64, and 65 is independently movable relative to one another and to the outer tubular member.

The upper end of each leg member 69 has a yoke portion 76 with holes 77 therethrough. A leg brace member 78 is pivotally connected at one end to each leg member 69 intermediate its ends. The free end of each leg brace member 78 is provided with a yoke portion 79 having holes therethrough. The bottom end of each leg member 69 is provided with a foot pad 80 formed of resilient material or may be provided with conventional wheels or casters. The upper ends or yokes 76 of two leg members 69 are pivotally mounted on each tongue 66 of the upper collar member 63 by a bolt and nut 81 through the holes 69 and 77 and similarly, the yoke end 79 of two leg brace members 78 are pivotally mounted in each tongue 66 of the lower collar member 64 by nuts and bolts 81. A bolt 82 is received through the holes 77 of the third leg 69 and yoke portion 79 of the leg brace 78 and a wing nut 83 is installed on the extended end of the bolts 82. The threaded shank of the bolts 82 within the yokes are placed in the slots 68 of the collars 63, 64, and 65.

It should be understood that the collars may be mounted on the outer tubular member 62 with the opening of the slots 68 facing up or down or in opposed relation, however, as seen in FIG. 15, the bottom collar having the slot opening facing down offers a more secure connection.

Thus, it can be seen that two of the legs 69 are pivotally secured to the holes 67 in the collars by bolts and nuts 81, whereas the third leg 69 is pivotally and removably secured by bolts 82 and wing nuts 83 within the slots 68 of the collars. In this manner, the third leg may be easily and quickly removed from the collars 63 and 64 by loosening the wing nuts 83 and lifting the leg 69 and brace 78 out of the slot 68.

As shown in FIGS. 13 and 15, one or more auxiliary collars 65 may be mounted on the outer tubular member 62 at any height. When the third leg 69 is placed in the same upper leg support collars 63 and leg brace collars 64 as the other legs, the bottoms of the legs will extend radially an equal distance from the center of the outer tubular member 62.

The third leg 69 may be removed from the slots 68 in the collars 63 and 64 and the leg brace 78 placed into the slot 68 of the upper leg support collar 63 and the top end of the leg placed into one of the higher auxiliary collars 65 (FIG. 15).

As shown in dotted line, if the auxiliary collar 65 and its corresponding leg brace collar 63 or 65 are moved toward each other on the tubular member 62, the bottom of the leg connected thereto will be extended radially outward to be positioned an unequal distance from the center of the tubular member 62 relative to the other legs. If the auxiliary collar 65 and its corresponding leg brace collar 63 or 65 are moved away from each other on the tubular member 62, the bottom of the leg connected thereto will be drawn radially inward to be positioned an unequal distance from the center of the tubular member 62 relative to the other legs. This allows for placement of the stand in limited or confined areas. If the legs are supported on a level surface, this adjustment will allow the longitudinal axis of the stand to be disposed in an off-vertical axis position for placing the center of gravity of the supported article relative to the center of the supporting legs.

The collars 63, 64, and 65 may be positioned in vertically spaced pairs whereby the bottom of the leg(s) will be positioned vertically relative to the other leg(s). As described above, the legs may also be positioned radially inward and outward. This allows for placement of the stand on an uneven or multi-level surface or platform and also in limited or confined areas. The legs may also be adjusted relative to the uneven or multi-level surface to allow the longitudinal axis of the stand to be disposed in an off-vertical axis position for placing the center of gravity of the supported article relative to the center of the supporting legs even if they are at different heights.

An elongate inner tubular member 85 is slidably received within outer tubular member 62. A clamp member 38 is mounted on the top end of the outer tubular member 62. The clamp member 38 and its operation have been previously described with reference to FIGS. 1 and 10-13, and will not be described again in detail to avoid repetition.

Also previously described, a third tubular member 51 may be slidably received inside the inner tubular member 85 and a conventional split clamp member 53 having the usual bolt and wing nut 54 may be secured at the upper end of the inner tubular member 85 to clamp the third tubular member 51 at a desired height. A conventional inverted L-shaped clamp member 55 having the usual bolt and wing nut 56 may also be installed on the exterior of third tubular member 51 and engaged on the clamp 53 to maintain the upper portion of the upper upstanding member at the desired circumferential orientation relative to the base portion.

Similarly, the top portion of the stand may have various conventional tripod mounting hardware 57 for mounting a variety of articles and instruments such things as cameras, video equipment, telescopes, surveying instruments, and musical instruments. It should be understood that the particular tripod stand illustrated has a top portion configured to support musical cymbals, however other top portions may be provided for supporting such things as cameras, video equipment, telescopes, surveying instruments, and the like.

While this invention has been described fully and completely with special emphasis upon a preferred embodiment, it should be understood that within the scope of the appended claims the invention may be practiced otherwise than an specifically described herein.

I claim:

1. An adjustable tripod stand having independently adjustable legs comprising:

an upright portion for supporting an object at its upper end, a plurality of independently movable collar members slidably mounted on said upright portion and longitudinally adjustable relative to one another and to said upright portion for selective positioning thereon, releasable fastening means on said collars for securing same to said upright portion at selected positions, and a plurality of movable leg members operatively connected at their upper ends to different ones of said collar members and operable on independent movement of said collar members for selective independent longitudinal positioning and radial extension relative to said upright portion and to one another for supporting said upright portion, whereby said stand may be erected in limited or confined areas, on multi-level surfaces, and on level surfaces, and the positioning of said collars allows the longitudinal axis of the stand to be disposed in an off-vertical axis position for positioning the center of gravity of the supported article relative to the center of the supporting legs.

2. An adjustable tripod stand according to claim 1 in which said upright portion comprises telescoping tubular members longitudinal extensible relative to each other, and including fastening means on said upright portion for releasably securing said telescoping tubular members together in a selected position.

3. An adjustable tripod stand according to claim 2 in which said upright portion includes an elongate outer tubular member and an elongate inner tubular member slidably received therein, and the lower end of said outer tubular member is substantially enclosed sufficient to trap air within the tubular members and allow it to escape slowly through the clearance annulus between the tubular members upon sudden longitudinal movement of said inner tubular member relative to said outer tubular member to serve as an air cushion which allows said inner tubular member to descend slowly in the event that it is suddenly or accidentally released.

4. An adjustable tripod stand according to claim 2 in which the lower section of said upright portion includes an elongate outer tubular member and an elongate inner tubular member slidably received therein, said outer tubular member has a pair of opposed grooves extending longitudinally along its interior surface, and the lower end of said inner tubular member has a pin extending transversely through its side wall, the outer ends of which are received within said opposed grooves to prevent relative rotary movement between said inner and outer tubular members but allowing relative longitudinal movement.

5. An adjustable tripod stand according to claim 1 in which
said collars are movable relative to each other and movable past each other on said upright portion.

6. An adjustable tripod stand according to claim 1 in which
said collars are movable relative to each other and not movable past each other on said upright portion,
at least one of leg members being releasably connected to a collar and being connectable to another collar to permit independent adjustment relative to others of said collars.

7. An adjustable tripod stand according to claim 1 in which
each said leg member comprises an elongate leg portion and a leg brace member having one end pivotally connected thereto intermediate the ends of the elongate leg portion and extending therefrom.

8. An adjustable tripod stand according to claim 1 in which
each said leg member comprises an elongate leg portion and a leg brace member having one end pivotally connected thereto intermediate the ends of the elongate leg portion and extending therefrom,
said collars include at least one upper leg support collar having leg support means for pivotally supporting the upper portion of at least one said leg member, and
at least one leg brace support collar disposed beneath said upper leg support collar and having brace support means for pivotally supporting the extended end of at least one said leg brace member, such that
when said upper leg support collar and the corresponding said leg brace collar are moved toward each other on said upright portion the bottom of said leg connected thereto will be extended radially outward to be positioned an unequal distance from the center of the upright portion relative to the other legs, and
when said upper leg support collar and the corresponding said leg brace collar are moved away from each other on said upright portion the bottom of said leg connected thereto will be drawn radially inward to be positioned an unequal distance from the center of the upright portion relative to the other legs.

9. An adjustable tripod stand according to claim 8 in which
the exterior of each said upper leg support collar member has circumferentially spaced projections for pivotally connecting the upper end of said leg member thereto, and
the exterior of each said leg brace support collar member has circumferentially spaced projections for pivotally connecting the leg brace member of each leg member thereto.

10. An adjustable tripod stand according to claim 8 in which
the upper portion of said at least one leg member is pivotally and releasably connected to said upper leg support collar, and
the extended end of said leg brace is pivotally and releasably connected to said leg brace support collar disposed beneath said upper leg support collar, whereby
at least one said leg member and its said leg brace member may be removed from a vertically spaced upper leg support collar and leg brace support collar and pivotally and releasably connected to a differently spaced upper leg support collar and leg brace support collar, such that
said at least one leg member may be selectively positioned vertically relative to the other said leg members.

11. An adjustable tripod stand according to claim 8 in which
said upright portion includes an elongate tubular member having a plurality of circumferentially spaced grooves extending longitudinally on its exterior surface, and
said collar members are operatively connected with said grooves to slide longitudinally therein.

12. An adjustable tripod stand according to claim 11 in which
said grooves include at least two diametrically opposed grooves each having a generally U-shaped cross section,
said upper leg support collar and said leg brace support collar each comprise at least two semi-cylindrical collar segments slidably mounted on said outer tubular member and having inwardly facing longitudinal edges received within said U-shaped longitudinal grooves, and
each said semi-cylindrical collar segment is independently movable relative to one another and to said outer tubular member and each may be secured in a desired position on said outer tubular member, such that
when one said upper leg support collar segment and the corresponding said leg brace collar segment are moved toward each other on said outer tubular member the bottom of said leg connected thereto will be extended radially outward to be positioned an unequal distance from the center of the upright portion relative to the other legs, and
when said upper leg support collar segment and the corresponding said leg brace collar are moved away from each other on said outer tubular member the bottom of said leg connected thereto will be drawn radially inward to be positioned an unequal distance from the center of the upright portion relative to the other legs.

13. An adjustable tripod stand according to claim 12 in which
at least one said semi-cylindrical upper leg support collar segment and its corresponding semi-cylindrical leg brace support collar segment may be selectively positioned vertically different relative to other said semi-cylindrical upper leg support collar segments and their corresponding leg brace support collar segments.

14. An adjustable tripod stand according to claim 12 including
a semi-cylindrical sleeve element disposed between the exterior of said outer tubular member and the interior of each said collar segment to facilitate sliding movement of said collar segments on said outer tubular member.

15. An adjustable tripod stand according to claim 12 in which said grooves include at least two diametrically opposed grooves each having a generally dovetail cross section, and said releasable fastening means on said collars for securing same to said upright portion at selected positions comprises;

a wedge element having a generally dovetail cross section slightly smaller than said dovetail grove slidably received within said dovetail grooves inwardly adjacent to each said semi-cylindrical collar segment and connected to each said segment by wing screws extending radially through the side wall of each said collar segment, whereby upon loosening said wing screw, said wedge, collar segment, and sleeve are free to slidably move as a unit longitudinally on said outer tubular member but are captured on said outer member by said wedge retained in said dovetail groove, and upon tightening said wing screw, said wedge is drawn into firm engagement on the angular sides of said dovetail groove to lock said collar member in a desired position on said outer tubular member.

16. An adjustable tripod stand according to claim 1 in which said upright portion comprises telescoping tubular members longitudinally extensible relative to each other, and including fastening means on said upright portion for releasably securing said telescoping tubular members together in a selected position comprising a clamp member mounted on the top end of said outer tubular member and having a bore at its upper end to slidably pass said inner tubular member therethrough, a lever member pivotally mounted on said clamp member and having a camming surface at the upper end thereof and resilient means disposed between said clamp member and said lever hand grip portion, said lever camming surface being disposed adjacent said inner tubular member and sectioned into three angular planes, such that when said lever is in an intermediate position, said resilient means will provide sufficient force to frictionally engage and grip a middle angular plane of said camming surface on the exterior of said inner tubular member whereby said inner tubular member is maintained at a selected height under normal support conditions but may be moved longitudinally without gripping the lever upon application of sufficient axial force to overcome the frictional engagement, when said lever hand grip portion is pressed inward to an unlocked position, a lower angular plane of said camming surface is aligned substantially parallel with said inner tubular member such that said inner tubular member slides freely through said clamp member as long as said lever is pressed inward and when released said resilient means returns said lever to the intermediate position, and when said lever is pivotally raised to a locked position, an upper angular plane of said camming surface is forcefully engaged on the exterior of said inner tubular member such that said inner tubular member is securely locked at a selected height under heavy support conditions to prevent accidental or unexpected longitudinal movement.

17. An adjustable tripod stand according to claim 16 in which each said leg member comprises an elongate leg portion and a leg brace member having one end pivotally connected thereto intermediate the ends of the elongate leg portion and extending therefrom, and said upright portion includes an elongate outer tubular member and an elongate inner tubular member slidably received therein.

18. An adjustable tripod stand according to claim 1 including a foot pad of resilient material on the bottom end of each said leg member.

19. An adjustable tripod stand according to claim 1 including a caster on the bottom end of each said leg member.

20. An adjustable tripod stand according to claim 1 in which said collars are movable relative to each other and not movable past each other on said upright portion, at least one of leg members being releasably connected to a collar and being connectable to another collar to permit independent adjustment relative to others of said collars, each said leg member comprises an elongate leg portion and a leg brace member having one end pivotally connected thereto intermediate the ends of the elongate leg portion and extending therefrom, the other end of each said brace member being connected to one collar, one end of each said leg member being initially connected to another collar, and at least one of leg members being releasably connected to said another collar and being connectable to a third collar to permit independent adjustment relative to others of said collars.

21. An adjustable tripod stand according to claim 20 in which the leg brace member for said at least one leg member is releasably connected to said one collar whereby said at least one leg member and its brace member are both connectable to other collars to permit independent adjustment relative to others of said collars.

22. An adjustable tripod stand according to claim 21 in which the releasable connection between said at least one leg member and its brace member and one of said collars comprises an apertured tongue on one and an apertured yoke on the other, a bolt extending through said apertures, and a nut releasably holding said bolt.

23. An adjustable tripod stand according to claim 1 in which said collars are movable relative to each other and not movable past each other on said upright portion, at least one of leg members being releasably connected to a collar and being connectable to another collar to permit independent adjustment relative to others of said collars, each said leg member comprises an elongate leg portion and a leg brace member having one end pivotally connected thereto intermediate the ends of the elongate leg portion and extending therefrom, the other end of each said brace member being connected to one collar, one end of each said leg member being initially connected to another collar, and at least one of leg members being releasably connected to said another collar and being connectable to a third collar so that when an upper leg support collar and the corresponding said leg brace collar are moved toward each other on said upright portion the bottom of said leg connected thereto will be extended radially outward to be positioned an unequal distance from the center of the upright portion relative to the other legs, and when an upper leg support collar and the corresponding said leg brace collar are moved away from each other on said upright portion the bottom of said leg connected thereto will be drawn radially inward to be positioned an unequal distance from the center of the upright portion relative to the other legs.

24. An adjustable tripod stand according to claim 23 in which the leg brace member for said at least one leg member is releasably connected to said one collar whereby said at least one leg member and its brace member are both connectable to other collars to permit independent adjustment relative to others of said collars.

25. An adjustable tripod stand according to claim 23 in which the releasable connection between said at least one leg member and its brace member and one of said collars comprises an aperture tongue on one and an apertured yoke on the other, a bolt extending through said apertures, and a nut releasably holding said bolt.

26. An adjustable tripod stand comprising a tripod base, an upright portion extending from said tripod base comprising telescoping tubular members longitudinally extensible relative to each other, fastening means on said upright portion for releasably securing said telescoping tubular members together in a selected position comprising a clamp member mounted on the top end of said outer tubular member and having a bore at its upper end to slidably pass said inner tubular member therethrough, a lever member pivotally mounted on said clamp member and having a multi-planar camming surface at the upper end thereof and resilient means disposed between said clamp member and said lever hand grip portion, said lever camming surface being disposed adjacent said inner tubular member and sectioned into three distinct angular planes, such that when said lever is in an intermediate position, said resilient means will provide sufficient force to frictionally engage and grip the middle angular plane of said camming surface on the exterior of said inner tubular member whereby said inner tubular member is maintained at a selected height under normal support conditions but may be moved longitudinally without gripping the lever upon application of sufficient axial force to overcome the frictional engagement, when said lever hand grip portion is pressed inward to an unlocked position, the lower angular plane of said camming surface is aligned substantially parallel with said inner tubular member such that said inner tubular member slides freely through said clamp member as long as said lever is pressed inward and when released said resilient means returns said lever to the intermediate position, and when said lever is pivotally raised to a locked position, the upper angular plane of said camming surface is forcefully engaged on the exterior of said inner tubular member such that said inner tubular member is securely locked at a selected height under heavy support conditions to prevent accidental or unexpected longitudinal movement.

* * * * *